(12) United States Patent
Rueb et al.

(10) Patent No.: US 11,878,430 B2
(45) Date of Patent: Jan. 23, 2024

(54) HANDLING APPLIANCE HAVING AN ADAPTIVE COLLISION PROTECTION SYSTEM

(71) Applicant: Robert Bosch GmbH, Stuttgart (DE)

(72) Inventors: Andreas Rueb, Tamm (DE); Simon Bock, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 17/490,363

(22) Filed: Sep. 30, 2021

(65) Prior Publication Data

US 2022/0111525 A1 Apr. 14, 2022

(30) Foreign Application Priority Data

Oct. 8, 2020 (DE) ...................... 10 2020 212 696.8

(51) Int. Cl.
*B25J 9/16* (2006.01)
*B25J 13/08* (2006.01)
*B25J 19/06* (2006.01)

(52) U.S. Cl.
CPC ........... *B25J 9/1676* (2013.01); *B25J 13/088* (2013.01); *B25J 19/06* (2013.01)

(58) Field of Classification Search
CPC ........ B25J 9/1676; B25J 13/088; B25J 19/06; B25J 13/085; B25J 19/063; G05B 2219/39574
See application file for complete search history.

(56) References Cited

U.S. PATENT DOCUMENTS

| 10,207,404 | B2 * | 2/2019 | Khansari Zadeh | .... G06N 20/00 |
| 2008/0190224 | A1 * | 8/2008 | Song | ........................ E05F 15/40 74/42 |
| 2013/0118287 | A1 | 5/2013 | Holgate | |
| 2015/0114165 | A1 * | 4/2015 | Lauzier | .................. B25J 19/063 901/46 |

(Continued)

FOREIGN PATENT DOCUMENTS

| DE | 3620391 A1 * | 12/1987 |
| DE | 3620391 A1 | 12/1987 |

(Continued)

*Primary Examiner* — Adam R Mott
*Assistant Examiner* — Sagar Kc
(74) *Attorney, Agent, or Firm* — Maginot, Moore & Beck LLP

(57) ABSTRACT

A handling appliance, in particular a robot, includes at least one handling device that is movable in at least one direction of movement, a collision protection device configured for limiting contact forces due to collisions of the handling device with objects, and an acquisition device. The collision protection device includes a kinematic system that mechanically enables a relative movement of the handling device relative to the carrier of the handling device and that can be inhibited by at least one actuator device. The acquisition device determines forces acting on the actuator device and/or the handling device and on components of the collision protection device decoupled by the actuator device, and the collision protection device accounts for the forces and, via the actuator device, in the absence of a collision prevents, and in the case of a collision triggers and/or enables, relative movement of the handling device relative to the carrier.

12 Claims, 7 Drawing Sheets

(56) References Cited

U.S. PATENT DOCUMENTS

| | | | | |
|---|---|---|---|---|
| 2016/0031086 A1* | 2/2016 | Tanabe | ............... | B25J 5/007 |
| | | | | 901/50 |
| 2018/0065252 A1* | 3/2018 | Tabandeh | ............... | B25J 9/1694 |
| 2019/0193269 A1* | 6/2019 | Lim | ............... | G05D 1/0227 |
| 2021/0260757 A1* | 8/2021 | Nielsen | ............... | B25J 9/163 |
| 2022/0388156 A1* | 12/2022 | Hansen | ............... | B25J 13/085 |

FOREIGN PATENT DOCUMENTS

| | | |
|---|---|---|
| DE | 296 07 680 U1 | 8/1996 |
| DE | 20 2004 007 938 U1 | 10/2005 |
| DE | 10 2007 028 758 A1 | 12/2008 |
| DE | 10 2007 053 737 A1 | 5/2009 |
| DE | 102007053737 A1 * 5/2009 ......... B23K 26/1488 |
| DE | 10 2009 047 033 A1 | 5/2011 |
| DE | 10 2010 052 418 A1 | 6/2011 |
| DE | 10 2010 063 202 A1 | 6/2012 |
| DE | 20 2014 007 052 U1 | 12/2014 |
| DE | 20 2013 105 501 U1 | 4/2015 |
| DE | 20 2013 105 504 U1 | 4/2015 |
| DE | 10 2018 208 247 A1 | 11/2019 |

* cited by examiner

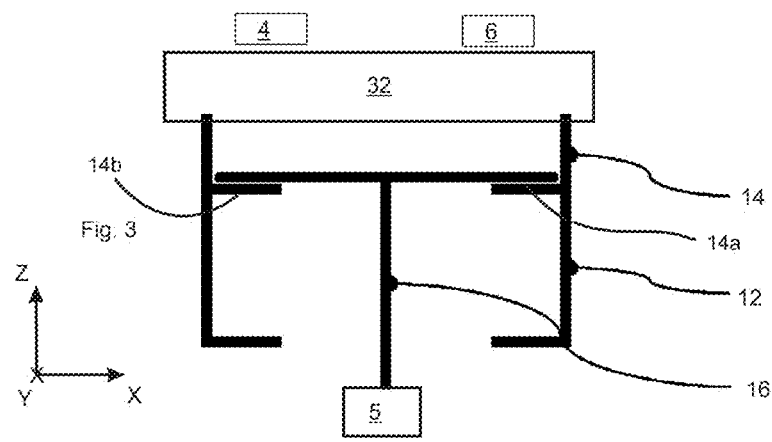
Fig. 3
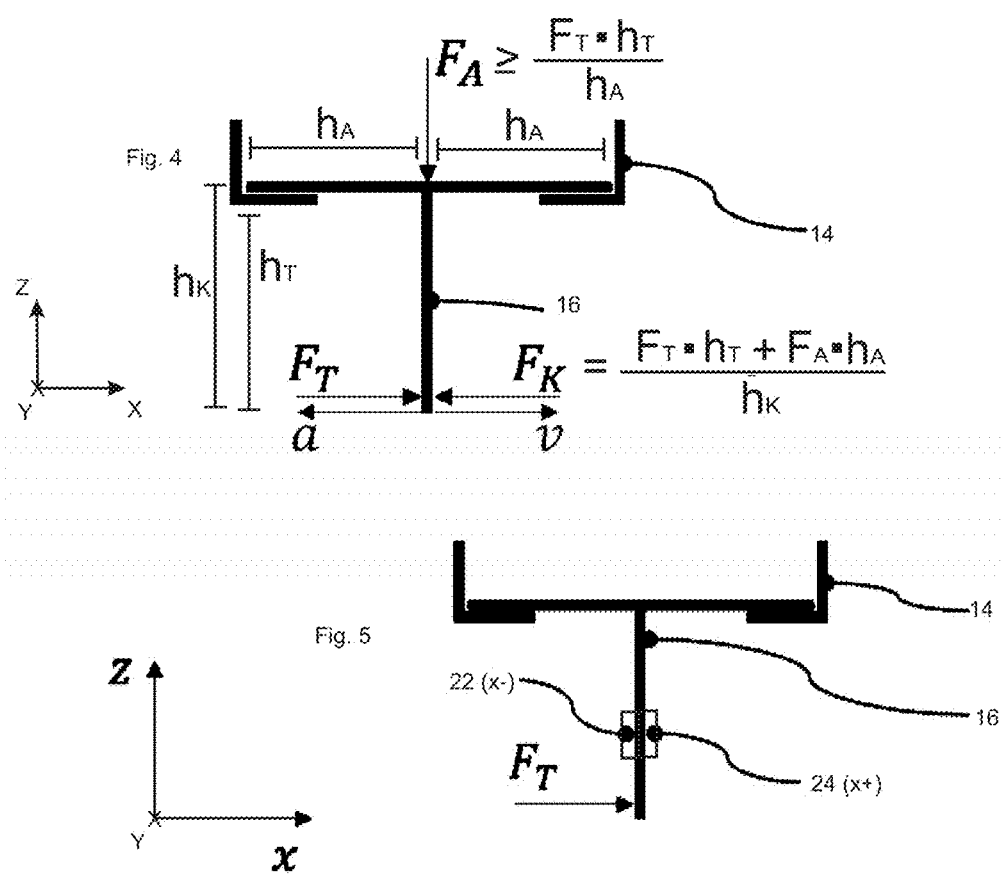
Fig. 4
Fig. 5

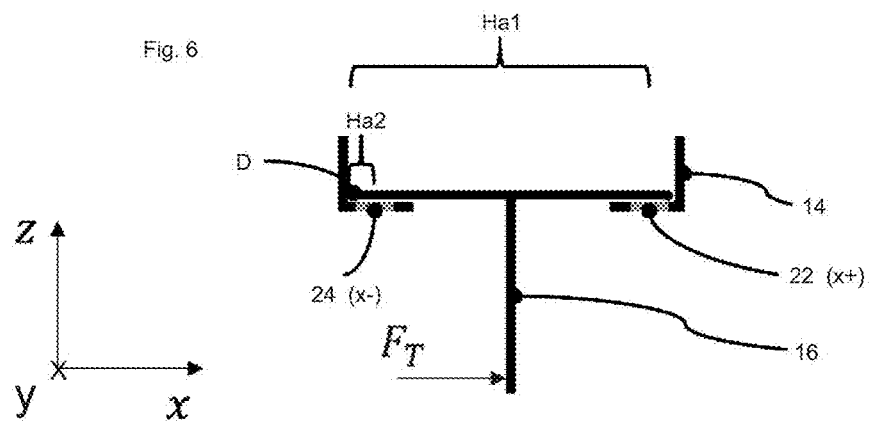
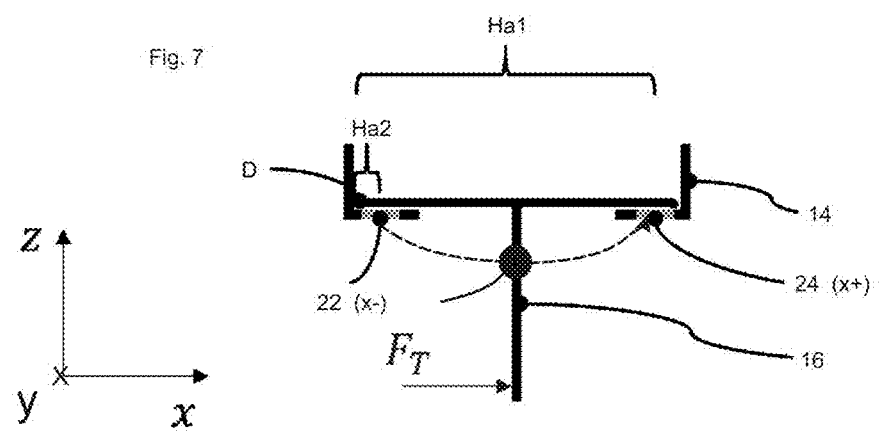
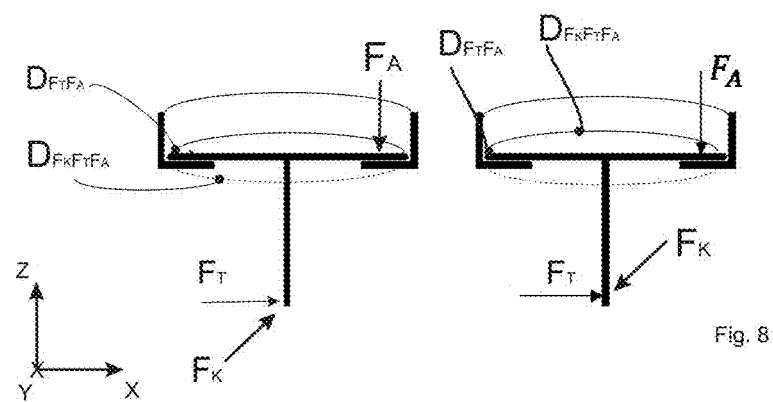

HANDLING APPLIANCE HAVING AN ADAPTIVE COLLISION PROTECTION SYSTEM

This application claims priority under 35 U.S.C. § 119 to application no. DE 10 2020 212 696.8, filed on Oct. 8, 2020 in Germany, the disclosure of which is incorporated herein by reference in its entirety.

BACKGROUND

The present disclosure relates to a handling appliance such as, for example, a robot. Such handling appliances have already been in use for a long time in the prior art to perform work operations. Such handling appliances in this case may have, for example, handling devices such as, for instance, gripping devices that are used for gripping and/or transporting objects, or also turning devices that are used, for example, for screwing. It is known that such handling appliances may have collision protection systems.

Collision protection systems are used in robotics, for example, to protect the robot, its end effectors and the environment, for instance in the robot cell. In the event of contact between the end effectors mounted on the robot flange, including the handled workpieces, and another object, that exceeds a certain force threshold, the collision protection usually enables the peripheral device to retract and/or triggers an emergency stop of the robot.

There are systems available on the market from various manufacturers. These are referred to, for example, as collision protection, overload protection, collision sensor, overload sensor, anti-collision sensor and overload protection sensor.

Typically, these systems use a mechanical system that is acted upon by a central pneumatic actuator. Thus, up to a certain force threshold, they are prevented from retracting. The pressure of the pneumatic actuator can be used to set the force threshold prior to operation.

Known from DE 20 2014 007 052 U1 is a collision protection system having a pneumatic actuator, the pressure of which is adjusted so that a certain force threshold is maintained.

DE 20 2014 007 052 U1 thus discloses an adaptive closed-loop control of the force threshold, but is limited to pneumatic actuators for an adaptive system, which are being progressively reduced in automation and which are difficult to control in a highly dynamic manner by closed-loop control.

It also specifies the degrees of freedom in x, y, and z, and monitoring of the system using the triggering distance. Moreover, it does not disclose any consideration of the weight force and inertial force of the end effectors by a model based on motion data, position data and orientation data, such that the variable to which control is being effected remains unclear.

A further object of the present disclosure is to achieve a greater variability with respect to the drive concepts and/or actuator concepts.

DE 20 2013 105 504 U1 describes a collision protection system that works together with the force sensors in a robot and that by yielding reduces the mass to be decelerated upon contact with a worker.

While collision protection systems can in principle reduce the mass to be decelerated and thus the collision force of the robot system, as disclosed in DE 20 2013 105 504 U1, the collision protection systems currently on the market are set to a certain actuator force prior to application. This has the consequence that the system cannot be set in such a way that, despite the weight force and inertial force, there is no triggering during traversal and, at the same time, there is a low force threshold in the event of a collision. The disclosure is therefore based on the further object of achieving effective collision protection even in the case of rapid movements and/or high accelerations.

Moreover, the mechanical systems/kinematic systems of the collision protection systems on the market for collisions from different directions have an extremely inhomogeneous force threshold, with the result that control to an exact value of the force threshold, even purely mechanically, is not possible. The present disclosure formulates mechanical design principles to address this issue.

DE 10 2009 047 033 A1 discloses a system for collision detection for an industrial robot using adjustment between a model fed from control data and a force-moment sensor system in the machine frame.

DE 10 2009 047 033 A1 therefore describes a principle for adjustment between a kinematic model, which works with motion data and position data, and an actually occurring value. For application on the end effectors of the robot, a sensor in the machine bed is unfavorable due to the oscillatory, long serial kinematic system of the robot. In addition, the controller would need time to detect the collision.

During this time and the entire braking operation of the robot, correspondingly high collision forces occur. A further object on which the disclosure is based is therefore the avoidance of high collision forces in this stated situation.

Known from DE 10 2010 063 202 A1 is a concept with pressure pieces for arresting. This system is designed to comply with the biomechanical limit values according to ISO 15066 at limited accelerations with static holding force.

DE 10 2010 063 202 A1 includes a collision protection that already complies with the standard values according to ISO 15066 for contact with a worker in a certain scope of application. However, due to the static setting of the force threshold based on the spring stiffness of the thrust pieces, in order to comply with the values this system can only operate in a very limited acceleration range, as otherwise false triggering will occur.

Handling appliances, in particular industrial robots, can cause considerable damage to themselves, their end effectors, for example tools, and their environment (in collaborative operation, in particular also workers) in the event of incorrect control or malfunction. There are already many approaches for protecting the handling appliance, such as the APAS sensor skin. However, this does not include the end effectors on the handling device, for example on a robot flange, although they have the greatest potential for damage/injury because of their geometry, which is difficult to influence, and the high speed.

The disclosure is based on the object, inter alia, of solving these problems.

SUMMARY

The disclosure solves these problems by using dynamically controlled actuators and a mechanical system that has a homogeneous triggering threshold.

The present disclosure therefore describes a handling appliance, in particular a robot having at least one handling device that is movable in at least one direction of movement, and having a collision protection device that is suitable and designed for preventing and/or limiting the contact forces in the event of collisions of the handling device with objects, the collision protection device having a kinematic system that mechanically enables a relative movement of the handling device with respect to the carrier of the handling device, this kinematic system being able to be inhibited by at least one actuator device and enabling the relative movement in the event of a collision.

An actuator device may be provided that is suitable and designed for triggering or enabling a movement of the handling device in the event of a collision.

According to the disclosure, the handling appliance comprises an acquisition device that determines forces acting on the actuator device and/or on the handling device and on the components of the collision protection device decoupled by the actuator device—in particular as a result of their movement and/or the orientation—and the collision protection device, taking account of these forces, through the actuator device, in the case of no collision prevents, and in the case of a collision triggers and/or enables, a relative movement of the handling device with respect to the carrier of the handling device.

The collision protection device can thus preferably determine the forces acting as a consequence of the movement of the actuator device and/or the handling device, and the collision protection device is preferably suitable and designed, taking account of these forces, for triggering or enabling a movement of the handling device.

In the context of the present disclosure, a handling appliance is understood to be a device that has one or more end effectors (gripper, screwdriver, welding tongs, . . . ) and can move these in at least one direction. The handling appliance in this case may also comprise a control/computation device capable of acquiring and processing signals. Furthermore, it may also comprise a collision protection system.

The handling appliance may thus be, for instance, an industrial robot. An industrial robot is a specific handling appliance. In addition, however, the disclosed embodiments may also be applied outside the field of industrial robotics, for example in fields such as care, service or automatic machines. In general, the disclosure is of interest in such fields of application in which a mechanical triggering by a human must be possible despite actually significantly higher operating forces.

Handling devices are all end effectors (such as, for instance, tools) and workpieces that can be carried and/or positioned and/or moved by a handling appliance and that, in particular, serve to perform a work task or are an integral part thereof.

The collision protection system described here is conceivable in combination with a very wide variety of end effectors such as, for example, grippers, screwdrivers and the like. The handling appliance therefore preferably has a handling device and is therefore in a sense a superordinate term.

An acquisition device is understood to be a device that serves to detect the forces occurring or acting as a result of a process or in general. It may have one or more sensor devices, or alternatively may receive values from a control system.

The acting forces are in particular acceleration forces and/or gravitational forces resulting from a pose of the handling appliance. A pose in this case describes a combination of a position and an orientation, in particular in three-dimensional space.

The static and dynamic forces acting on the handling device (peripheral device) are particularly relevant because they must be compensated. The actuator device is preferably arranged in the stationary part of the collision protection device, such that the dynamics and mass inertia of the latter do not contribute to these forces.

Preferably, the actuator device is designed, in the event of a collision, to trigger and/or enable a movement of the handling device, and in particular an evasive or backward movement (or a movement having at least one component opposite to the direction of movement) or a deceleration of the handling device. It is possible in this case for this movement to be triggered by the collision itself.

It is therefore possible that, in the event of a collision, the collision protection device limits the collision force that occurs, and/or upon occurrence of a collision allows an evasive or backward movement in order to prevent or reduce damage.

In the context of the present disclosure, therefore, a collision protection device is also understood to be a device designed to prevent damage to the handling device or other objects and/or persons in the event of collisions occurring.

In contrast to collision protection systems known from the prior art, it is therefore proposed that the movement data of the handling device such as, for instance, a gripping device, be also used to determine the handling forces present. For example the actuator forces, and thus the force threshold, above which the mechanical system enables withdrawal, may be set in response to these data.

An actuator force in this case is understood to be the force generated by an actuator. This is preferably controlled by open-loop and/or closed-loop control.

In the case of a preferred embodiment, the handling device is movable in a plurality of directions, in particular movable relative to the stationary environment. It is thus conceivable, for example, for the handling device to be movable in a plurality of linear directions, for example in mutually perpendicular directions. In addition, the handling device may also be rotatable about one or two or more rotational axes.

Thus, by adjustment of the triggering threshold, the present disclosure solves the problems described above, which are due to the fact that a collision protection system in the prior art can also only be used only up to certain accelerations.

In this way, such a collision protection system becomes more effective than non-adaptive systems. Thus, according to the disclosure, the collision protection system is adaptive and in particular also adapted to the movements of the handling devices.

Described below are a plurality of conceivable implementations that describe a feasible closed-loop control strategy for the actuators of the system.

Furthermore, as described below, no permanent calculation of a triggering threshold (i.e. a force to overcome the actuator) is necessary, but rather this threshold is preferably predefined.

It is preferred in this case that actuator values be permanently adjusted depending, inter alia, on the data determined. The triggering threshold is preferably also a part of these data and can be considered as a fixed additional offset results, from, inter alia, the permissible contact forces. These are preferably configured according to the application.

Preferably, the handling appliance has a control device that sets a counterforce to be exerted by the actuator device, which counterforce is overcome in the event of a collision, in order to allow an evasive movement and/or backward movement of the handling appliance or other elements of the handling appliance.

A counterforce is understood to be the force necessary to counteract another force such as, for instance, a weight force or inertial force. This counterforce may be calculated (preferably continuously). The sum may be set with an offset and/or a product may be set with an offset factor (for example by the actuator force converted via the mechanical system).

Preferably, the counterforce is not overcome by the collision object alone. It is possible, for example, for the counterforce to be overcome by the superimposition of dynamic/static forces acting on the handling device at that moment.

It is thus also proposed that the triggering threshold of the collision protection device be adaptively controlled by closed-loop control in order to compensate for the inertial and weight forces of the end effectors resulting from the position and motion of the robot. These forces may be calculated, preferably together with the mass and/or the center of gravity of the end effectors, on the basis of motion data and optionally also position data and/or orientation data.

These values may in this case be determined both on the basis of movement data or also position data, which may originate from a control system, in particular a robot control system, or alternatively these values may originate from a sensor system. In addition, it would also be possible to obtain data both from a sensor system and from a control system. Thus, for example, velocity data and acceleration data may be obtained from a control system, and other data may in turn be measured with sensors.

Preferably, the handling appliance according to the disclosure also comprises actuator devices that prevent the collision protection from retracting and/or evading in different degrees of freedom. These may be set, for example, on the basis of a kinematic model in such a way that they prevent the collision protection from being triggered when there is compliance with the calculated force values.

However, if a force occurs that is greater than a certain threshold value (or a certain triggering threshold), (in collaborative operation, the biomechanical limit value according to ISO 15066), the system triggers and allows the end effectors, for instance a gripper arm and/or gripper, to retract, preferably until all the driven axes of the handling appliance come to a standstill. It would also be possible to dissipate any residual energy.

In this way, the mass to be decelerated in the event of a collision is preferably reduced to the end effectors themselves, thus minimizing the contact forces that occur. At the same time, during the normal traversal of the handling appliance, or normal working operation, no false triggering occurs caused by the acceleration and the weight force of the end effectors.

This means that, in contrast to the use of conventional systems, significantly greater accelerations, and thus significantly shorter cycle times, can be achieved.

In addition, for example a robot arm and an area surrounding the robot are subjected to significantly lesser forces in the event of a collision. In collaborative operation, in particular, this enables compliance with the values specified by the standards, including for end effectors, and thus closes an important gap in the systems available on the market.

Compared to systems that use the force sensors and/or moment sensors of the robot device 1, another advantage, in addition to the reduction of the masses to be decelerated, is the reaction time of the system.

The reaction time of the system is also reduced in particular by the fact that the at least one actuator device is already adaptively set to a triggering threshold, or to a force threshold value. In the event of a collision, the retraction results from this triggering threshold, or this force threshold value, being directly overcome mechanically, and therefore no further calculations are necessary in the event of a collision.

If a triggering threshold is exceeded, a mechanical triggering occurs. No prior detection of the collision by the control system or another computing unit is required. Thus, in contrast to systems from the prior art, the forces do not have to be measured first, but rather the actuator device is already set to the correct triggering threshold.

In the case of a further advantageous embodiment, the handling appliance comprises a computation device, which determines a counterforce that prevents the handling device from withdrawing despite the forces that occur as a result of the movement and/or the orientation.

It is possible in this case for the counterforce to be determined on the basis of kinematic data as mentioned above, for example on the basis of movement data, or optionally also position data or orientation data. In addition, as mentioned above, the counterforce may also be sensed or determined by means of a sensor system.

In the case of a further advantageous embodiment, the handling appliance has a control device that controls the actuator device taking into account the forces determined by the acquisition device. In particular in this case, the actuator device may be controlled by closed-loop control, with these forces being taken into account.

The actuator device is thus settable and adaptive, in particular also settable taking into account the movement of the handling device and/or of the end effectors. Preferably, the actuator device is activated with the forces being taken into account. Thus, for example in the case of a pneumatic actuator, a corresponding pressure may be lowered or increased. If the actuator device is a magnetic system, counterforces of an electromagnet, for example, may be varied.

If a collision then occurs, the counterforces exerted as a result are to be regarded as those to which the actuator device is set. In this way, the collision protection device yields without further calculation, since a mechanical triggering threshold has just been overcome.

In the case of another preferred embodiment, the handling appliance comprises at least one actuator device that prevents the collision protection device from acting and/or a collision protection from withdrawing in predefined circumstances.

In the case of another preferred embodiment, the actuator device is selected from a group of actuator devices that comprises pneumatic actuator devices, hydraulic actuator devices, magnetic actuator devices, electromotive actuator devices, and the like.

Preferably, the actuator device is thus set in such a way that, up to a certain triggering threshold, no withdrawal occurs, but thereafter withdrawal (in particular of the handling device) and/or of the end effectors is initiated and/or enabled.

The withdrawal of a mechanical system is therefore preferably prevented by at least one actuator device, and preferably by a plurality of actuator devices, up to a certain triggering threshold. This triggering threshold is constantly controlled by closed-loop control in such a way that a retraction does not occur merely because of inertia or gravitational force as calculated in the model.

In addition, an offset may be provided to compensate for control deviations and latencies. It is thus possible, for example, for a predefined offset to be added for the determined triggering threshold.

Furthermore, it is also possible for only one actuator device to be provided, which blocks several or all degrees of freedom.

In the case of another preferred embodiment, a multiplicity of actuator device is provided to prevent the collision protection from drawing under predefined circumstances. Thus, for example, two actuator devices (for a forward movement and a backward movement) may be used for one direction of movement.

Preferably, to solve the problem a mechanical system of the disclosure is realized in such a way that an actuator device blocks the retraction in one axial direction and simultaneously blocks the opposite direction with no force or with only a greatly reduced (further) force. This can be effected in such a way in this case that two or more actuators are used per axis (translation and/or rotation axis), such that each of them blocks the axis only in a positive or negative direction. In addition, it is also possible for one or more actuators to be designed in such a way that the blocking exerted by them can be switched over between a positive and a negative axial direction.

Furthermore, it is possible to position two or more actuators in such a way that, in the case of a mechanical system having more than one rotation point, they have different levers in relation thereto. In addition, it is also possible for one or more actuator devices to be adjusted in its/their position such that the lever changes accordingly.

In the case of another preferred embodiment, there is at least one actuator device assigned to each degree of freedom of movement of the handling device. Thus, for example, each axis may have its own actuator devices in order to block (or, if necessary, to allow, in particular in the event of a collision) a retraction.

In addition, it is also possible for a mechanical system to be designed such that two or more forces, each acting on a respective axis, operate in the same manner, irrespective of their direction, against a common actuator device or a plurality of common actuator devices.

In the case of another advantageous embodiment, the handling appliance comprises an acquisition device for acquiring kinematic measurement values of the handling device. As mentioned above, these may be sensor devices that sense, for example, force values or also movement values. It is possible in this case for such sensor devices also to be available redundantly.

In addition, the acquisition device may also determine the corresponding measured values from, for example, a control device.

In the case of another preferred embodiment, at least one sensor device is suitable and designed for sensing an acceleration, position and/or orientation of the handling device. In this case, the center of gravity and the weight of the handling device and, if applicable, of an object held by the handling device, such as a workpiece to be transported, may also be taken into account.

In the case of a further advantageous embodiment, at least components of the collision protection device are arranged between the handling device and a carrier of the handling device. The carrier may be, for example, a robot flange, and the handling device or an end effector may be, for instance, a gripping device arranged on this robot flange. Preferably in this case, there is at least one actuator device arranged between this robot flange or, generally, between the carrier and the gripping device.

Preferably, the handling device is movable relative to the carrier, and in particular movable in at least one direction of movement, and preferably in a plurality of directions of movement. The handling device in this case may be, for example, rotatable relative to the carrier, or also pivotable or displaceable in at least one direction or also a plurality of directions.

In the case of another preferred embodiment, the collision protection device has a serial kinematic system, a parallel kinematic system or a mixed kinematic system composed of these types. Thus, different directions of movement may be rendered possible by mechanical systems connected in series and/or in parallel.

In the case of another preferred embodiment, the collision protection device ensures a minimum lever between the rotation point of the kinematic system and a collision force application point, this being effected in particular by use of a housing protected from contact by sensors. Thus, the handling appliance preferably comprises a housing on which at least one sensor device, and preferably a plurality of sensor devices, are arranged.

In the case of another advantageous embodiment, forces resulting from the movement and/or the orientation of the handling device do not hinder the kinematic system of the collision protection device from triggering or enabling a movement of the handling device. Preferably, therefore, such forces are taken into account in determination of, for example, the triggering threshold. In this case these forces may be modeled or calculated.

In the case of another preferred embodiment, the mechanical system of the collision protection device is at least partially serial, and preferably has a monitoring device for the triggering of at least one axis. Upon triggering, this can switch off the actuators of other axes, at least of those further counteracting the collision, and thus also enable a retraction in these axes even below the triggering threshold.

The present disclosure is additionally directed toward a method for operating a handling appliance, and in particular a robot having at least one handling device that is movable in at least one direction of movement. Provided in this case is a collision protection device that limits the contact forces in the event of collisions of the handling device with objects, the collision protection device comprising a kinematic system that enables a relative movement of the handling device with respect to a carrier of the handling device, this kinematic system being able to be inhibited by at least one actuator device, and the relative movement being triggered or enabled in the event of a collision.

Preferably, excessive contact forces are prevented in the event the handling device colliding with objects, the collision protection device having at least one actuator device that triggers or enables a movement of the handling device in the event of a collision.

According to the disclosure, the handling appliance comprises an acquisition device that determines the forces acting on the handling device and/or on the components of the collision protection device decoupled by the actuator device—in particular as a result of their movement and/or the orientation—and the collision protection device, taking account of these forces, through the actuator device, in the case of no collision prevents, and in the case of a collision triggers and/or enables, a relative movement of the handling device with respect to the carrier of the handling device.

Preferably, an acquisition device of the handling appliance senses the forces acting on the actuator device as a result of the movement of the handling device, and the collision protection device, taking account of these forces, triggers or enables a movement of the handling device.

The forces in this case may be, for example, weight forces or also inertial forces that act on the handling device. In addition, the forces may also be process forces, i.e. caused by the work process to be performed.

Particularly preferably in this case, the forces exerted by the actuator device that usually have to be overcome in particular in the event of a collision, are adapted adaptively and in particular also adjusted adaptively taking into account the movement of the handling device.

In this case triggering thresholds are determined that, in the event of a collision, result in withdrawing of the handling device.

Preferably, a counterforce exerted by the actuator device is set adaptively, which counterforce results in a mechanical withdrawal of the handling device in the event of a collision.

BRIEF DESCRIPTION OF THE DRAWINGS

Further advantages and embodiments are given by the appended drawings. There are shown therein:

FIG. 3 a representation of the structure according to the disclosure;

FIG. 4 a representation illustrating the problems of previous mechanical systems;

FIG. 5 a representation illustrating separate axes;

FIG. 6 a representation illustrating separate axes in a lever-operated mechanical system;

FIG. 7 a representation illustrating separate axes in the case of a position change;

FIG. 8 a representation relating to the force ratio of cumulative acceleration forces and collision forces against an actuator force;

DETAILED DESCRIPTION

Figure 1:
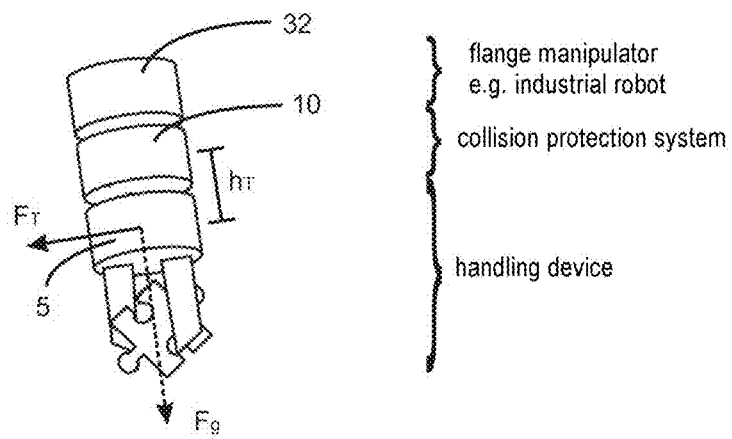
FIG. 1 a schematic representation illustrating the forces that occur.

Illustrated in FIG. 1 are the forces occurring during the movement of handing devices 5. On the one hand, an inertial force $F_T$ occurs, which is opposed to the acceleration of the center of gravity, or the corresponding force $F_a$. In evaluation of the inertial force, it is also necessary in this case to take into account the height $h_T$ that denotes the length of a lever arm, which corresponds to the distance between the center of mass and the bearing point of the end effectors in the collision protection system 10. In addition, there is also the weight force $F_g$ due to the handling device and/or a workpiece held by it.

Based on these forces, a model may be calculated that, in turn, serves to output the respective kinematic data. The calculation of such a model may be performed, for example, on a control board that preferably also controls the actuator devices or the actuator device by closed-loop control.

Figure 2:
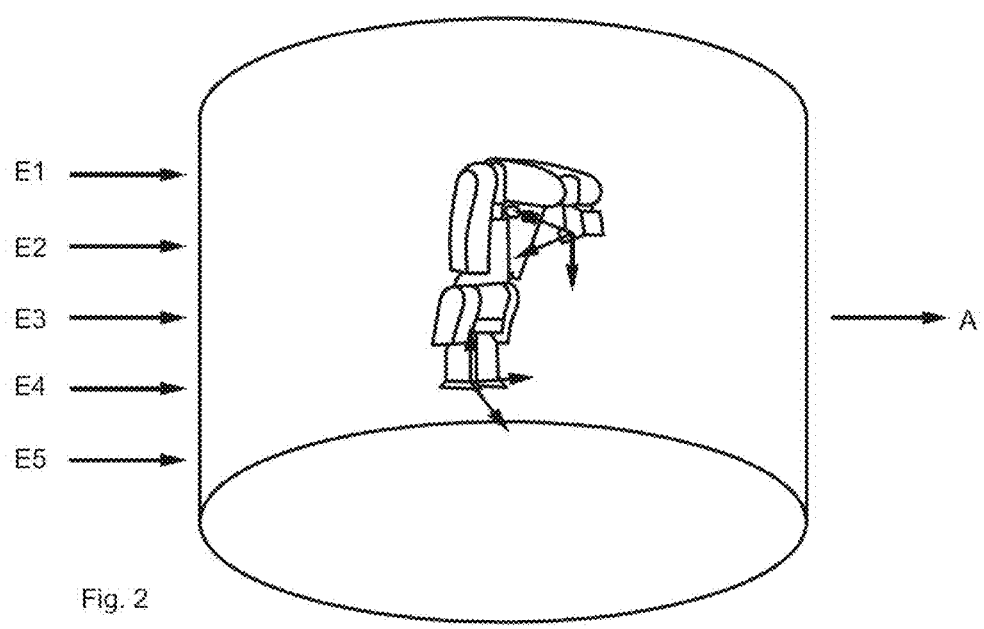
FIG. 2 a representation describing the procedure according to the disclosure.

This preferably results in a kind of black box as shown in FIG. 2. The control data used may be extended by the velocity, depending on how the actuator devices are activated. For example in this case, input data E1 to E5 may be entered. Thus, for example, the input value E1 may be an attached mass, the input value E2 may be center of gravity coordinates, the input value E3 may be a TCP (tool center point) acceleration, the input value E4 may be a TCP position, and the input value E5 may be a triggering threshold. Based on this model, it can be calculated whether an emergency stop is to be performed (output value A). Preferably, however, only default values for the activation of the actuator device are calculated, i.e. in particular retention forces or vectors.

FIG. 3 shows a very basic and schematic structure of a system according to the disclosure. The mechanical part of the system in this case is arranged between a robot flange 32 and a peripheral device 5 such as, for instance, a gripping device. This mechanical part, which for example comprises a housing 12, allows retraction in different degrees of freedom. The reference 4 denotes, in highly schematic form, an acquisition device for acquiring the input data E1-E5. In this case sensor devices (not shown) may be provided, or acquisition may also be effected from the programming of the control system.

Reference 6 indicates, also schematically, a computation device that calculates at least one triggering threshold from which an evasive or backward movement is to be initiated in the event of a collision. On the basis of this calculated triggering threshold, an actuator device (not shown in FIG. 3) can be set and, in particular, set to a specific counterforce, which is usually at least partially overcome in the event of a collision.

The rotational degrees of freedom about the x-, y- and z-axis, as well as a translational z-axis, are useful here.

With the introduction of each additional degree of freedom, the mechanics become more complex, but a reduction results in constrained guidance in the case of a retraction movement.

If it is possible to create a minimum lever in the z-direction with respect to the central rotation point of the construction by means of a housing 12, the latter preferably having a protective device (such as a sensor skin), then translational collisions (e.g. in the x- and y-direction) will also trigger the rotational axes (x and y).

Here, the lever 16 swivels with the e.g. gripping device 5 arranged thereon, and thus movements in x and y can also be triggered. The following figures each show a highly simplified 2D model of a hitherto common concept, to illustrate the disclosure. In principle, however, any selection and number of degrees of freedom are possible.

References 14a and 14b denote support elements, and reference 16, as mentioned, denotes a lever. When the lever is moved, the left and right sides of the support plate 15, for example, may be raised. Corresponding actuators are not represented in FIG. 3. These prevent the lever 16 from swiveling relative to the housing, up to a certain threshold value, i.e. the triggering threshold. At forces exceeding this (in particular in the event of a collision), such a swiveling is made possible, and thus also a withdrawal, or an emergency stop, of the handling device 5.

A retraction of the mechanical system is prevented, up to a certain triggering threshold, by the actuator devices (not shown). This triggering threshold is constantly controlled by closed-loop control in such a way that a retraction due only to the inertial or gravitational force (as calculated in the model) does not take place. To compensate for control deviations and latencies, a certain offset is advantageous, as mentioned above. The mechanical system is actually designed in such a way that for a force, irrespective of its direction, a certain triggering threshold is applied to trigger the collision protection. This also applies when the offset is taken into account. Preferably, the offset substantially or exclusively affects the collision force.

Existing mechanical system concepts usually block all degrees of freedom simultaneously with a single actuator. This has the advantage that it is necessary to use only one actuator device that absorbs the maximally occurring sum of inertial and weight force. In the case of adaptive operation, however, this results in the situation that in the event of a collision against the acceleration, in order to achieve triggering it is necessary to work against the actuator that is active due to the inertial and weight force.

A case in which this occurs would be a braking movement towards the collision object or the worker. Conversely, this means that with such a mechanical system only accelerations that do not activate the actuator too strongly are possible, such that in the event of a collision the triggering threshold is exceeded.

Illustrated in FIG. 4 are forces such as occur due to the inertial force $F_T$ produced contrary to the acceleration a and, in order to prevent the mechanical system from being triggered by traversal, an actuator force $F_A$ that is set accordingly. If a collision then occurs contrary to the velocity v, a force $F_K$ results, which is composed of 2 components. On the one hand, the opposing inertial force $F_T$, but also additionally the total actuator force $F_A$ in the form of an equilibrium of moments about the resulting common rotation point D. In realistic application scenarios, this value is significantly greater than the biomechanical limit value. For simplification, this and also the following models include only the inertial force, which in the correct realization, however, corresponds to the superimposition of inertial and weight force.

FIG. 5 shows an example of a possibility for dividing the actuator devices in a manner in which each of the actuator devices 22, 24 exclusively blocks the negative or positive direction of the axis in the x-direction. In this case, the actuator devices 22, 24 may preferably be conceived of as a kind of pressure piece, which withdraw when a corresponding force is applied.

In concepts of this kind, an actuator device for one direction of the axis does not interfere with the movement in the opposite direction. FIG. 5 can also be used to illustrate the change in the direction of action of the actuator device if one imagines only one of the actuator devices, which can act on either the right or left side due to a position shift or a lever.

FIGS. 6 and 7 that follow show a design in which each of the actuator devices 22 and 24 acts with a different lever against a triggering of the mechanical system in the negative and positive x-direction, respectively. In the case of the designs shown in FIGS. 6 and 7, the actuator devices may be, for example, magnetic holding devices, such as electromagnets.

Depending on the exact placement, an actuator device that blocks one direction of a degree of freedom has no lever, or only a small lever, with respect to the opposite direction.

This means that a movement contrary to the blocking direction of the actuator device is not inhibited, or is only slightly inhibited.

The possibility of changing the position, also mentioned above, can be described by FIG. 7. Here, the magnet shifts in a three-dimensional direction under the support, with an indicated force case from left to right (for example due to a rotation), the lever changing considerably with respect to the rotation point.

The references Ha1 and Ha2, and Ha+ and Ha−, in FIG. 7 denote the lever arm in position 1 and the lever arm at position 2. The reference 14 again denotes a bearing, or support, and the reference 16 the lever, or movable part. The rotation points are each denoted by the references D.

The concept presented thus far, of separating each axis into positive and negative directions with respect to the actuator devices, involved consideration in models with only two degrees of freedom.

Even if the implementation of such a collision protection system is conceivable, the implementation with a plurality of degrees of freedom for retraction is much more likely due to the application, for example, on industrial robots with movements in all 6 degrees of freedom. There then arises another problem of the kinematic systems commonly used hitherto. There, the actuator not only blocks the retraction simultaneously in the positive and negative direction of one axis, but also of a plurality of axes. This also can result in the collision having to work against an active actuator in order to achieve a triggering.

The disclosure again proposes two approaches to this problem:

On the one hand, each axis may have its own actuator device to block retraction.

On the other hand, the mechanical system may be configured so that two or more forces, each acting on a respective axis, work in the same way against a common actuator device, or to common actuator devices, irrespective of their direction.

FIG. 8 illustrates this using an example. In the situation represented in FIG. 8 a circumferentially arranged actuator device is provided, and in the situation shown in FIG. 9 a centrally acting actuator device is provided. The actuator devices, with their respective forces $F_A$, can counteract both the forces $F_K$ and $F_T$.

The variants proposed by the disclosure may be categorized as serial, parallel or mixed kinematic systems. This is always represented by the type of axis division according to the two possibilities of the preceding descriptions.

Figure 9A:
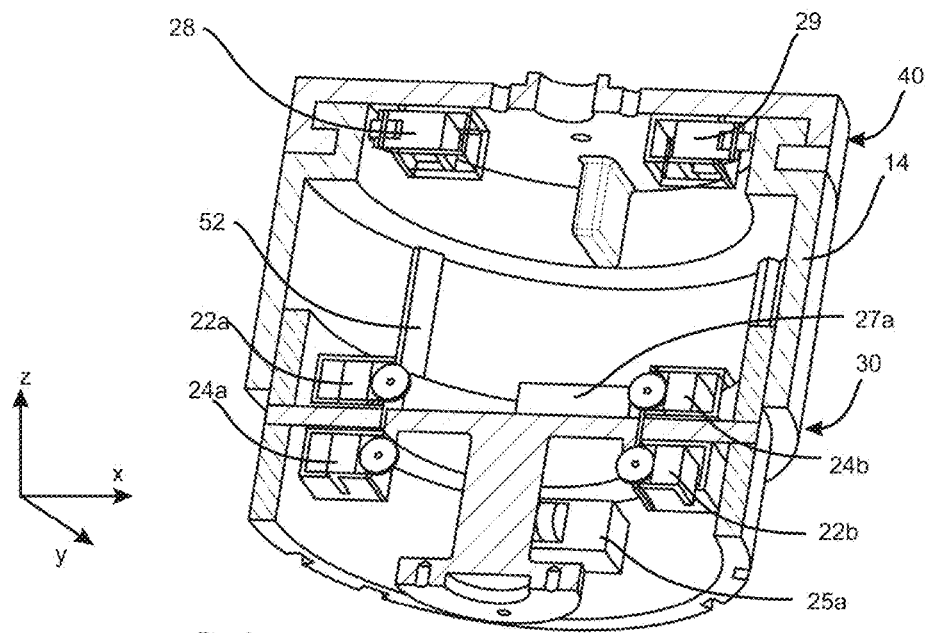
FIGS. 9a-c a design of a serial kinematic system.
Figure 9B:
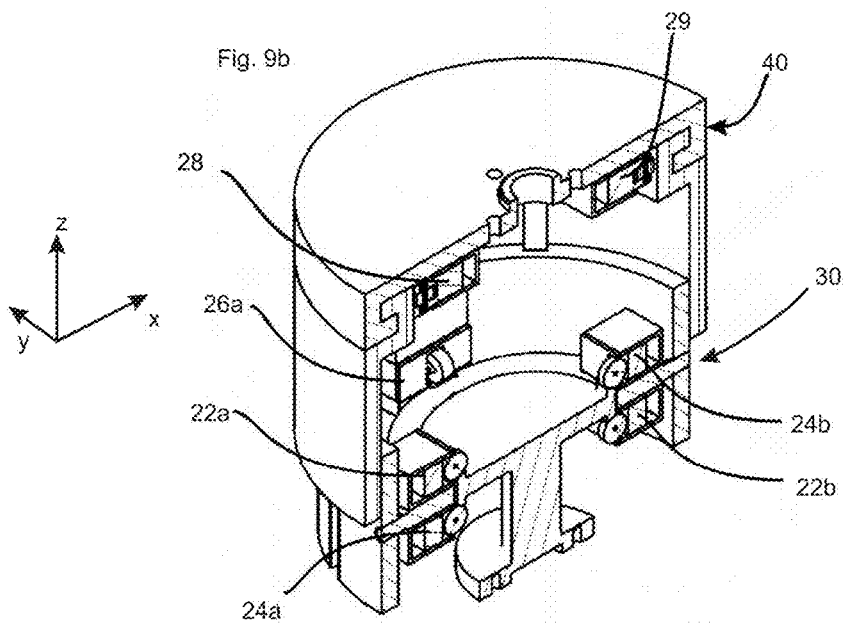
Figure 9C:
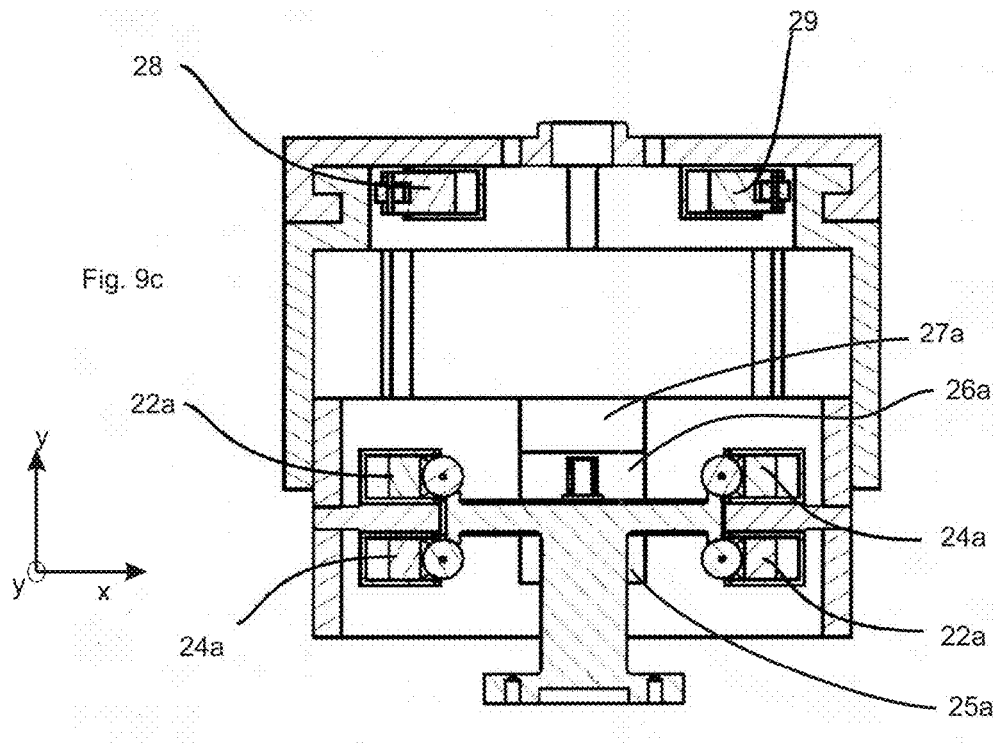

The following are examples of implementations of the different types:

FIGS. 9a-c show a serial kinematic system. The system in this case covers the axes about x, y, z and in z.

A rotary joint 40, which is succeeded in series by the other joints, serves as a torsion take-up about z. The references 28, 29 denote the actuator devices of the two axial directions of this torsion take-up.

A cardanic suspension 30 enables retraction about the x and y axes. Despite the serial characteristics, this bearing is very compact and, due to its design, offers good possibilities for accommodating actuator devices. The actuator devices 22a/b and 24a/b act for the two directions of rotation about the Y-axis, and the actuator devices 25a and 26a act for the two directions of rotation about the X-axis, two further actuator devices having a direction of action about the X-axis not being represented, due to the sectional view shown in FIG. 10a.

Two separate rotary joints, which are less space-efficient, may also be mentioned as other exemplary solution possibilities for the implementation of the x- and y-axes. Finally, the construction has a linear bearing 52 for the translatory z-axis, also having actuator devices 27a for spring deflection. One or more other symmetrically mounted actuator devices are not represented, due to the sectional view.

With this construction, all axes are mechanically independent of each other. If each axis is now blocked separately in the positive and the negative direction with an actuator device, a purely serial kinematic system is obtained, which thus makes it possible to adjust the system to a force vector in amount and direction without preventing the triggering in the event of a collision beyond the triggering threshold.

In the case of serial kinematic systems, it can happen that triggering occurs only in one degree of freedom of the mechanical system, although the collision force vector also has components in other directions, but these are below the triggering threshold. This results, in the case of the retraction movement, in a constrained guidance in the triggered direction.

To circumvent this the disclosure proposes, in the case of a serial or mixed kinematic system, to monitor the triggering of the mechanical system in all degrees of freedom in such a way that all actuator devices are switched off upon triggering. In the case of electromagnets, for example, an inductive sensor could operate as a normally closed contact and de-energize all electromagnets.

Figure 10A:
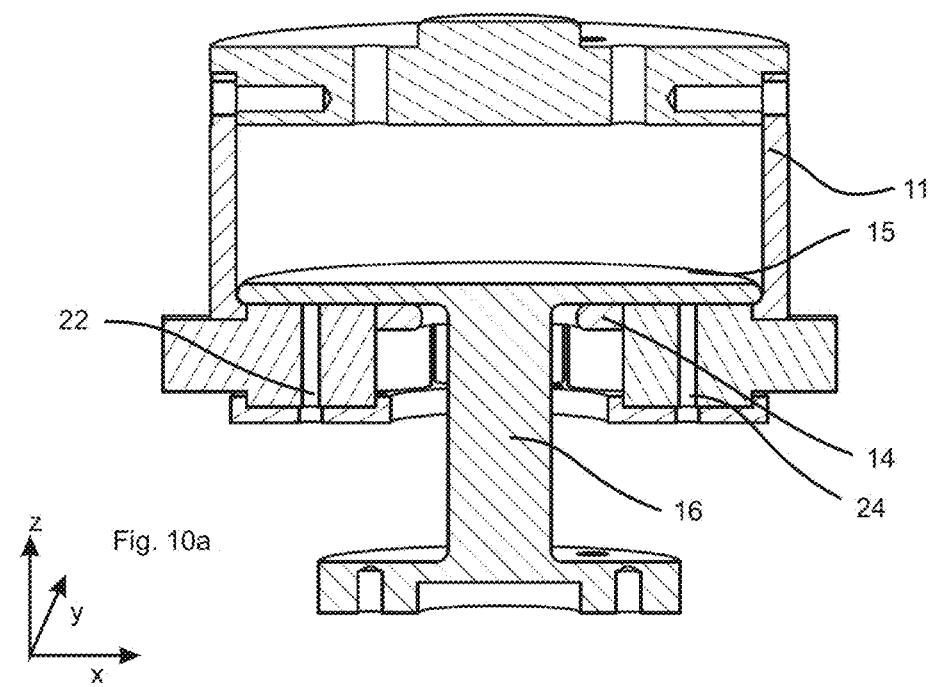
FIGS. 10a-c a design of a parallel kinematic system.
Figure 10B:
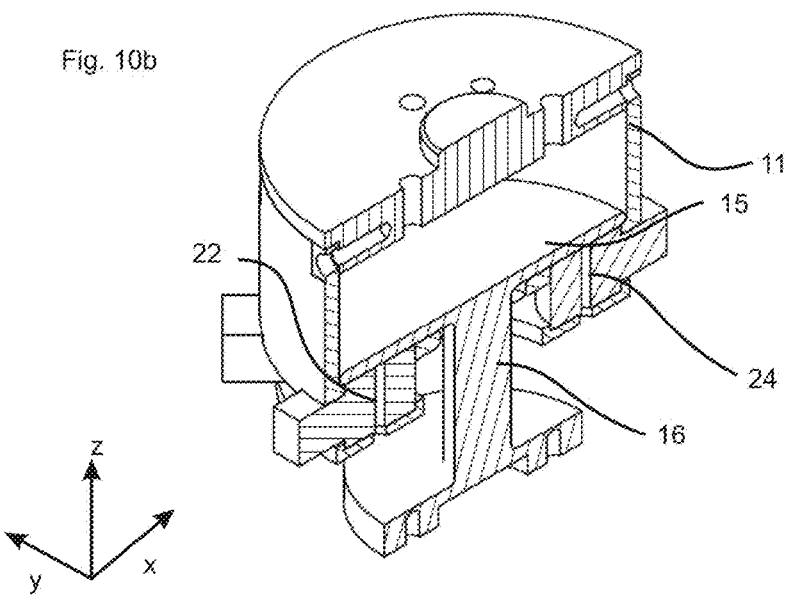
Figure 10C:
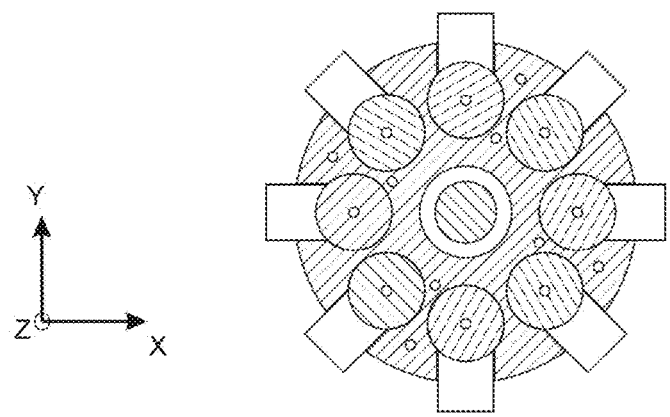

FIGS. 10a-c show an example of a parallel kinematic system, with FIG. 10c showing a sectional view.

The system in this case covers the axes about x and y, as well as in z direction. All axes are covered by a construction in which a disk 15 is located in a cylinder 11 with a circumferential support 14. In this case the geometry of the edge of the disk is shaped in such a way that the disk 15 can tilt circumferentially on the support. A shaft 16 projects through a recess in the support 14 and connects the disk 15 to the tool flange.

If this construction is then mounted between a robot flange and the end effectors, it enables the movements about x and y, as well as in the positive z-direction.

Holding actuator devices 22, 24 (such as electromagnets) mounted circumferentially in the support surface serve to block the kinematic system. With this construction, a purely parallel structure is then obtained, both mechanically and in respect of the actuator devices.

Purely parallel kinematic systems have the advantage that exceeding the force threshold also releases the other degrees of freedom possible through the mechanical system. This means that there is only a constrained guidance due to the mechanical design, but not the activation.

Figure 11A:
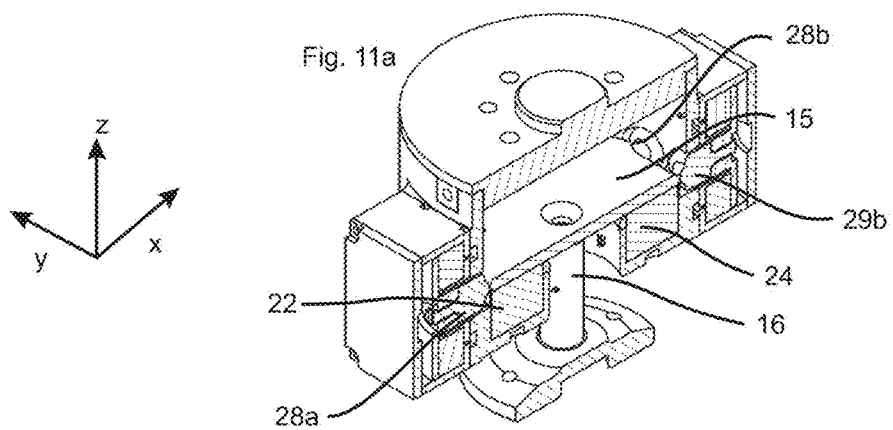
FIGS. 11a-b a representation of mixed kinematic system.
Figure 11B:
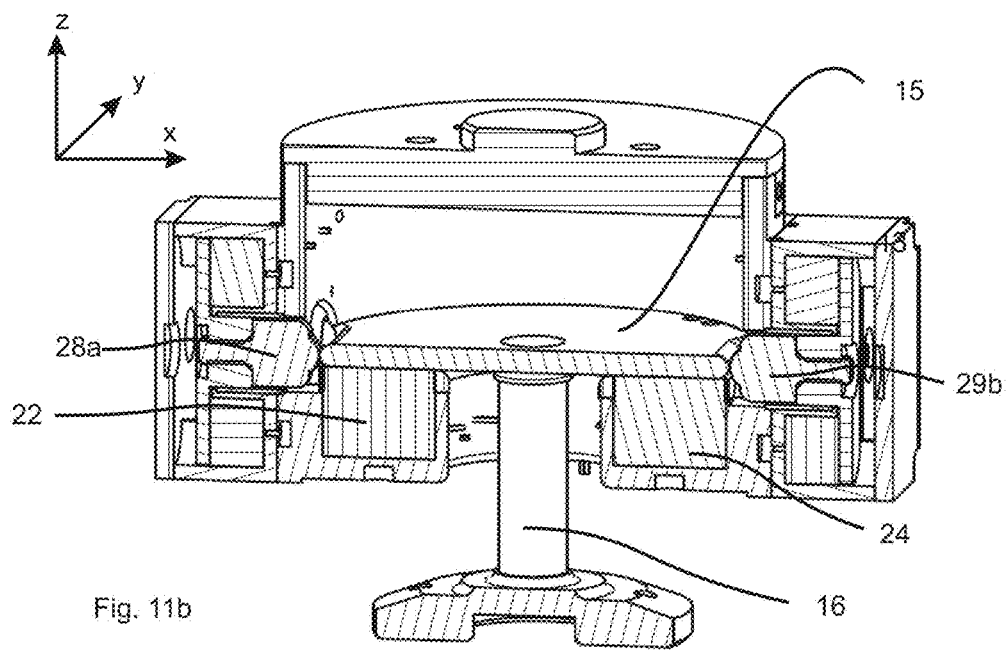
Figure 12:
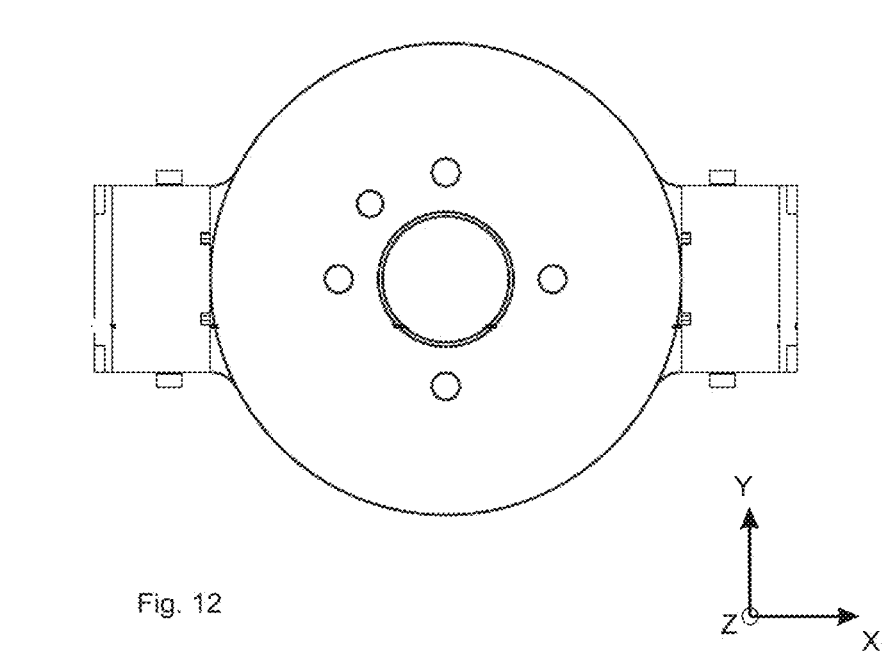
FIG. 12 a representation of the mixed kinematic system from above.

FIGS. 11a,b and 12 show an example of a mixed kinematic system, in a side view and a top view.

The basic kinematic system follows the parallel kinematic system described in the previous point. This means that a parallel kinematic system works about x and y, as well as in z. Now a torsion axis about z is serially added to the concept. This is done by attaching cams on the disc 15, which are blocked laterally by actuator devices 28a/b and 29a/b.

The actuators in this case are shaped in such a way that they prevent a rotation about z. However, a rotation about x or y is still only inhibited by the circumferential actuators. As described in connection with the serial kinematic system, it is the case that circumvention of the constrained guidance by an actuator device can be intercepted by corresponding sensors/switches.

Again, it should be noted that the preceding constructions are intended to describe the disclosure only by way of example. All types of joins may be combined serially, in parallel or mixed in the manner described. This also applies to the arrangement and type of actuator device.

The invention claimed is:

1. A handling appliance, comprising:
   at least one handling device that is movable in at least one direction of movement;
   a collision protection device configured to limit contact forces due to collisions of the handling device with objects, the collision protection device comprising a kinematic system that mechanically enables a relative movement of the handling device with respect to a carrier of the handling device, said kinematic system being configured to be inhibited by at least one actuator device and to enable the relative movement in a collision; and
   an acquisition device configured to determine forces acting on the at least one actuator device and/or on the handling device and on components of the collision protection device decoupled by the at least one actuator device,
   wherein the collision protection device is configured to account for the determined forces and, via the at least one actuator device, the collision protection device is configured to:
      in the absence of a collision, prevent relative movement of the handling device with respect to the carrier of the handling device, and
      in response to a collision, trigger and/or enable relative movement of the handling device with respect to the carrier of the handling device,
   wherein:
      the at least one actuator device includes first actuators of at least one first axis and second actuators of at least one second axis, and
      a mechanical system of the collision protection device is at least partially serial and is configured to trigger the first actuators of the at least one first axis and, upon triggering the first actuator, switch off at least the second actuators of the at least one second axis that further counteract the collision so as to enable a retraction in the at least one second axis even below a triggering threshold.

2. The handling appliance according to claim 1, further comprising controller configured to determine a counterforce that prevents the handling device from withdrawing despite forces that occur as a result of a movement and/or an orientation.

3. The handling appliance according to claim 1, wherein the controller is configured to control the at least one actuator device by open-loop and/or closed loop control taking into account the determined forces determined by the acquisition device.

4. The handling appliance according to claim 1, wherein a mechanical system of the handling appliance is realized in such a way that a first actuator device of the at least one actuator device blocks a retraction in one axial direction and simultaneously blocks an opposite direction with a reduced force or with no force.

5. The handling appliance according to claim 1, wherein the at least one actuator device includes one or more actuator devices assigned to each degree of freedom of movement of the relative movement of the handling device with respect to the carrier of the handling device.

6. The handling appliance according to claim 1, wherein the acquisition device is configured to acquire kinematic parameters of the handling device.

7. The handling appliance according to claim 6, further comprising at least one sensor device configured to sense an acceleration, position and/or orientation of the handling device.

8. The handling appliance according to claim 1, wherein at least components of the collision protection device are arranged between the handling device and a carrier of the handling device.

9. The handling appliance according to claim 1, wherein the kinematic system is a serial, parallel or mixed kinematic system.

10. The handling appliance according to claim 1, wherein the handling appliance is configured such that forces resulting from movement and/or orientation of the handling device do not hinder the kinematic system of the collision protection device from enabling movement of the handling device.

11. The handling appliance according to claim 1 wherein the handling appliance is a robot.

12. A method for operating a handling appliance having at least one handling device that is movable in at least one direction of movement, and a collision protection device configured to limit contact forces due to collisions of the handling device with objects, the collision protection device including a kinematic system having at least one actuator device that inhibits a relative movement of the handling device with respect to a carrier of the handling device and, in a collision, enables the relative movement of the handling device with respect to the carrier, the method comprising:

determining, with an acquisition device, forces acting on the handling device and/or on components of the collision protection device decoupled by the actuator device resulting from movement and/or orientation of the handling device and of the collision protection device;

in the absence of a collision, operating the at least one actuator device to prevent relative movement of the handling device with respect to the carrier of the handling device; and in response to a collision, operating the at least one actuator device to trigger and/or enable relative movement of the handling device with respect to the carrier of the handling device, wherein:

the at least one actuator device includes first actuators of at least one first axis and second actuators of at least one second axis, and a mechanical system of the collision protection device is at least partially serial and is configured to trigger the first actuators of the at least one first axis and, upon triggering the first actuator, switch off at least the second actuators of the at least one second axis that further counteract the collision so as to enable a retraction in the at least one second axis even below a triggering threshold.

* * * * *